(12) United States Patent
Doan et al.

(10) Patent No.: US 6,602,624 B1
(45) Date of Patent: Aug. 5, 2003

(54) CONTROL APPARATUS AND METHOD FOR EFFICIENTLY HEATING A FUEL PROCESSOR IN A FUEL CELL SYSTEM

(75) Inventors: Tien M. Doan, Columbia, MD (US); Bruce J. Clingerman, Palmyra, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/507,805

(22) Filed: Feb. 22, 2000

(51) Int. Cl.⁷ .............................................. H01M 8/04
(52) U.S. Cl. ........................................ 429/13; 429/22
(58) Field of Search ............................. 429/13, 17, 22, 429/24

(56) References Cited

U.S. PATENT DOCUMENTS

| | | |
|---|---|---|
| 4,128,700 A | 12/1978 | Sederquist |
| 4,293,315 A | 10/1981 | Sederquist |
| 4,555,454 A | 11/1985 | Shuster |
| 4,642,272 A | 2/1987 | Sederquist |
| 4,650,727 A | 3/1987 | Vanderborgh et al. |
| 4,659,634 A | 4/1987 | Struthers |
| 4,670,359 A | 6/1987 | Beshty et al. |
| 4,678,723 A | 7/1987 | Wertheim |
| 4,816,353 A | 3/1989 | Wertheim et al. |
| 4,923,768 A | 5/1990 | Kaneko et al. |
| 4,994,331 A | 2/1991 | Cohen |
| 5,248,567 A | 9/1993 | Amemiya et al. |
| 5,271,916 A | 12/1993 | Vanderborgh et al. |
| 5,272,017 A | 12/1993 | Swathirajan et al. |
| 5,316,871 A | 5/1994 | Swathirajan et al. |
| 5,372,617 A | 12/1994 | Kerrebrock et al. |
| 5,429,886 A | 7/1995 | Struthers |
| 5,484,577 A | 1/1996 | Buswell et al. |
| 5,484,666 A | 1/1996 | Gibb et al. |
| 5,518,705 A | 5/1996 | Buswell et al. |
| 5,518,828 A | 5/1996 | Senetar |
| 5,554,453 A | 9/1996 | Steinfeld et al. |
| 5,605,770 A | 2/1997 | Andreoli et al. |
| 5,637,415 A | 6/1997 | Meltser |
| 5,678,647 A * | 10/1997 | Wolfe et al. ................ 180/650 |
| 5,702,838 A | 12/1997 | Yasumoto et al. |
| 5,763,113 A | 6/1998 | Meltser et al. |
| 5,789,091 A | 8/1998 | Wozniczka et al. |
| 5,989,739 A * | 11/1999 | Zur Megede et al. ......... 429/13 |
| 6,159,626 A * | 12/2000 | Keskula et al. ............... 429/22 |
| 6,267,792 B1 * | 7/2001 | Nagamiya et al. ............ 48/197 |
| 6,268,074 B1 * | 7/2001 | Siepierski et al. ............ 429/13 |

FOREIGN PATENT DOCUMENTS

WO   WO 98/08771   3/1998

OTHER PUBLICATIONS

Szaniszlo, "The Advanced Low–Emissions Catalytic–Combustor Program: Phase I—Description and Status," ASME #79–GT–192, Mar. 5, 1979.

Krill et al., "Catalytic Combustion for System Applications," ASME #79–HT–54, Mar. 14, 1979.

Hall et al., "A Porous Media Burner for Reforming Methanol for Fuel Cell Powered Electric Vehicles," SAE Paper #950095, Feb. 27, 1995.

Natural Gas Power Plant System (a descriptive drawing), no date.

* cited by examiner

*Primary Examiner*—Randy Gulakowski
*Assistant Examiner*—Monique Wills
(74) *Attorney, Agent, or Firm*—Karl F. Barr, Jr.; Cary W. Brooks; Linda M. Deschere

(57) ABSTRACT

A control apparatus and method for efficiently controlling the amount of heat generated by a fuel cell processor in a fuel cell system by determining a temperature error between actual and desired fuel processor temperatures. The temperature error is converted to a combustor fuel injector command signal or a heat dump valve position command signal depending upon the type of temperature error. Logic controls are responsive to the combustor fuel injector command signals and the heat dump valve position command signal to prevent the combustor fuel injector command signal from being generated if the heat dump valve is opened or, alternately, from preventing the heat dump valve position command signal from being generated if the combustor fuel injector is opened.

16 Claims, 3 Drawing Sheets

CONTROL APPARATUS AND METHOD FOR EFFICIENTLY HEATING A FUEL PROCESSOR IN A FUEL CELL SYSTEM

GOVERNMENT SUPPORT

The Government of the United States of America has right in this invention pursuant to Agreement No. DE-AC02-90CH10435 awarded by the U.S. Department of Energy.

FIELD OF THE INVENTION

This invention relates to a fuel cell system and more particularly to a system having a plurality of cells which consume an $H_2$-rich gas to produce power.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements which (1) serve as current collectors for the anode and cathode, and (2) contain appropriate channels and/or openings therein for distributing the fuel cells gaseous reactants over the surfaces of the respective anode and cathode catalysts. The term fuel cell is typically used to refer to either a single cell or a plurality of cells (stack) depending on the context. A plurality of individual cells are commonly bundled together to form a fuel cell stack and are commonly arranged in series. Each cell within the stack comprises the membrane electrode assembly (MEA) described earlier, and each such MEA provides its increment of voltage. A group of adjacent cells within the stack is referred to as a cluster. Typical arrangements of multiple cells in a stack are described in U.S. Pat. No. 5,763,113, assigned to General Motors Corporation.

In PEM fuel cells, hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

For vehicular applications, it is desirable to use a liquid fuel such as an alcohol (e.g., methanol or ethanol), or hydrocarbons (e.g., gasoline) as the source of hydrogen for the fuel cell. Such liquid fuels for the vehicle are easy to store onboard and there is a nationwide infrastructure for supplying liquid fuels. However, such fuels must be dissociated to release the hydrogen content thereof for fueling the fuel cell. The dissociation reaction is accomplished within a chemical fuel processor or reformer. The fuel processor contains one or more reactors wherein the fuel reacts with steam and sometimes air, to yield a reformate gas comprising primarily hydrogen and carbon dioxide. For example, in the steam methanol reformation process, methanol and water (as steam) are ideally reacted to generate hydrogen and carbon dioxide. In reality, carbon monoxide and water are also produced. In a gasoline reformation process, steam, air and gasoline are reacted in a fuel processor which contains two sections. One is primarily a partial oxidation reactor (POX) and the other is primarily a steam reformer (SR). The fuel processor produces hydrogen, carbon dioxide, carbon monoxide and water. Downstream reactors may include a water/gas shift (WGS) and preferential oxidizer (PROX) reactors. In the PROX, carbon dioxide ($CO_2$) is produced from carbon monoxide (CO) using oxygen from air as an oxidant. Here, control of air feed is important to selectively oxidize CO to $CO_2$.

Fuel cell systems which process a hydrocarbon fuel to produce a hydrogen-rich reformate for consumption by PEM fuel cells are known and are described in co-pending U.S. patent application Ser. Nos. 08/975,422 and 08/980,087, filed in November, 1997, and U.S. Ser. No. 09/187,125, filed in November, 1998, and each assigned to General Motors Corporation, assignee of the present invention; and in International Application Publication Number WO 98/08771, published Mar. 5, 1998. A typical PEM fuel cell and its membrane electrode assembly (MEA) are described in U.S. Pat. Nos. 5,272,017 and 5,316,871, issued respectively Dec. 21, 1993 and May 31, 1994, and assigned to General Motors Corporation.

Efficient operation of a fuel cell system depends on the ability to effectively balance the three main components of a fuel cell system, namely, the combustor, the fuel cell stack and the fuel processor. While this hardware arrangement forms an efficient fuel cell system, it creates a control balance problem since the three major components have circular dependencies. Specifically, the combustor receives excess fuel from the stack. The stack receives fuel from the fuel processor and the fuel processor receives heat from the combustor. Control problems may arise if all three components cannot maintain a perfect balance. For example, if the combustor sends too little heat to the fuel processor, the fuel processor cannot fully reform water and methanol such that the fuel cell stack receives harmful "breakthrough" methanol. Conversely, if the combustor sends too much heat to the fuel processor, the fuel processor will overheat and damage the fuel processor catalyst.

Other system constraints add to the control problem. The fuel cell stack requires a specific amount of reformate from the fuel processor. The amount depends on the vehicle load and its operating anode lambda. Typically, the anode lambda is about 1.2 meaning that the stack receives 1.2 times the hydrogen needed for the amperage requested from the vehicle. The stack consumes the hydrogen to generate electricity, with any excess hydrogen sent to the combustor.

In a typical implementation, the fuel processor converts methanol and water into reformate consisting of hydrogen, carbon dioxide and water. The reformate feeds into the anode side of the fuel cell stack. Thus, the fuel processor must deliver the exact amount of reformate to the stack. Supplying more reformate than necessary hurts efficiency. Supplying less reformate than necessary does not meet the needs of the vehicle.

The combustor uses excess stack hydrogen as fuel and combusts it with air to generate heat for the fuel processor. The fuel processor needs the heat to convert methanol and water into reformate. However, the combustor must consume all of the excess hydrogen received from the fuel cell stack. Otherwise, flammable hydrogen passes outside the fuel cell system during normal operation.

Operating conditions that do not allow a perfect balance require an adjustment. Thus, it would be desirable to provide an apparatus and method for efficiently heating the fuel processor of a fuel cell system which allows adjustment in the operation of the interconnected combustor, fuel cell stack and fuel processor of the fuel cell system. It would also be desirable to provide an apparatus and method which provides these functions while at the same time meeting the vehicle load needs during dynamic fuel cell system operation and preventing the expulsion of flammable hydrogen outside of the fuel cell system.

SUMMARY OF THE INVENTION

The present invention is a unique control apparatus and method for efficiently controlling the amount of heat generated by a fuel processor which uniquely controls a combustor fuel injector and an excess heat dump valve such that only one of the fuel injector or the heat dump valve is on at any given time.

In one aspect of the invention, the unique method includes the steps:

determining a temperature difference between the actual operating temperature of the fuel processor and the desired operating temperature of the fuel processor at a given fuel cell stack load;

if the actual temperature of the fuel processor is less than the desired temperature of the fuel processor, predicting the amount of heat required by the fuel processor based on the determined temperature difference;

generating a command to the fuel injector to supply fuel to the combustor to generate the required amount of heat only if the heat dump valve is closed;

if the actual temperature of the fuel processor is greater than the desired temperature of the fuel processor, determining the amount of heat that must be diverted from the combustor prior to input to the fuel processor to lower the actual temperature of the fuel processor to the desired temperature;

determining the position of the heat dump valve orifice to divert the determined amount of heat; and generating a command to the heat dump valve orifice to divert the desired amount of heat only if the fuel injector is closed.

In another aspect of the invention, the method further comprises the steps of determining if the fuel injector orifice is open and, if so, generating a signal; and determining if the heat dump valve orifice is open and, if so, generating a signal.

Preferably, the method includes the step of providing the heat dump valve as linear actuator with a variable diameter outlet or orifice.

The method also maintains the heat dump valve orifice open until the actual temperature of the fuel processor equals or is less than the desired operating temperature of the fuel processor.

The method also includes the step of maintaining the fuel injector on until the actual temperature of the fuel processor is greater than or equal to the desired operating temperature of the fuel processor.

Finally, the method of generating the required amount of heat comprises the steps of:

generating a required heat command; and converting the required heat command to the amount of fuel injected to the fuel injector based on air flow to the combustor.

In another aspect of the invention, an apparatus is provided for controlling the amount of heat generated by a fuel processor in a fuel cell system, the apparatus includes means for predicting the heat required by the fuel processor for a given load on the fuel cell stack, and means for determining a temperature difference between the actual operating temperature of the fuel processor and the desired operating temperature of the fuel processor at a given load. Means are provided for obtaining a desired heat value based on the predicted heat and the temperature difference.

The apparatus also includes means for converting the desired heat value to a desired fuel injector flow signal. Means are provided for determining a heat dump valve flow position for a desired amount of heat diversion. Finally, the apparatus includes means, responsive to the state of the heat dump valve and the fuel injector, for preventing the heat dump valve from opening if the fuel injector is opened and for preventing the fuel injector from opening if the heat dump valve is opened.

The control apparatus and method of the present invention uniquely maintains the operating conditions and parameters of a combustor, fuel cell stack and fuel processor in a fuel cell system in a balanced state under all load conditions by efficiently controlling the heating of the fuel processor. This balanced state is achieved by preventing an excess heat dump valve and a combustor fuel injector from being activated at the same time. In this manner, heat trim to increase the heat supplied to the fuel processor or a heat dump to divert a portion of the heat generated by the combustor away from the fuel processor ensures that the various elements of the fuel cell system remain in a balanced state.

BRIEF DESCRIPTION OF THE DRAWING

The various features, advantages and other uses of the present invention will become more apparent by referring to the following description and drawing in which.

DETAILED DESCRIPTION OF THE PREFERRED EMBODIMENT

The present invention is an apparatus and method for efficiently heating the fuel processor of a fuel cell system by efficiently controlling and balancing the operation of the combustor, the fuel cell stack and the fuel processor of the fuel cell system under all vehicle load conditions.

Figure 1:
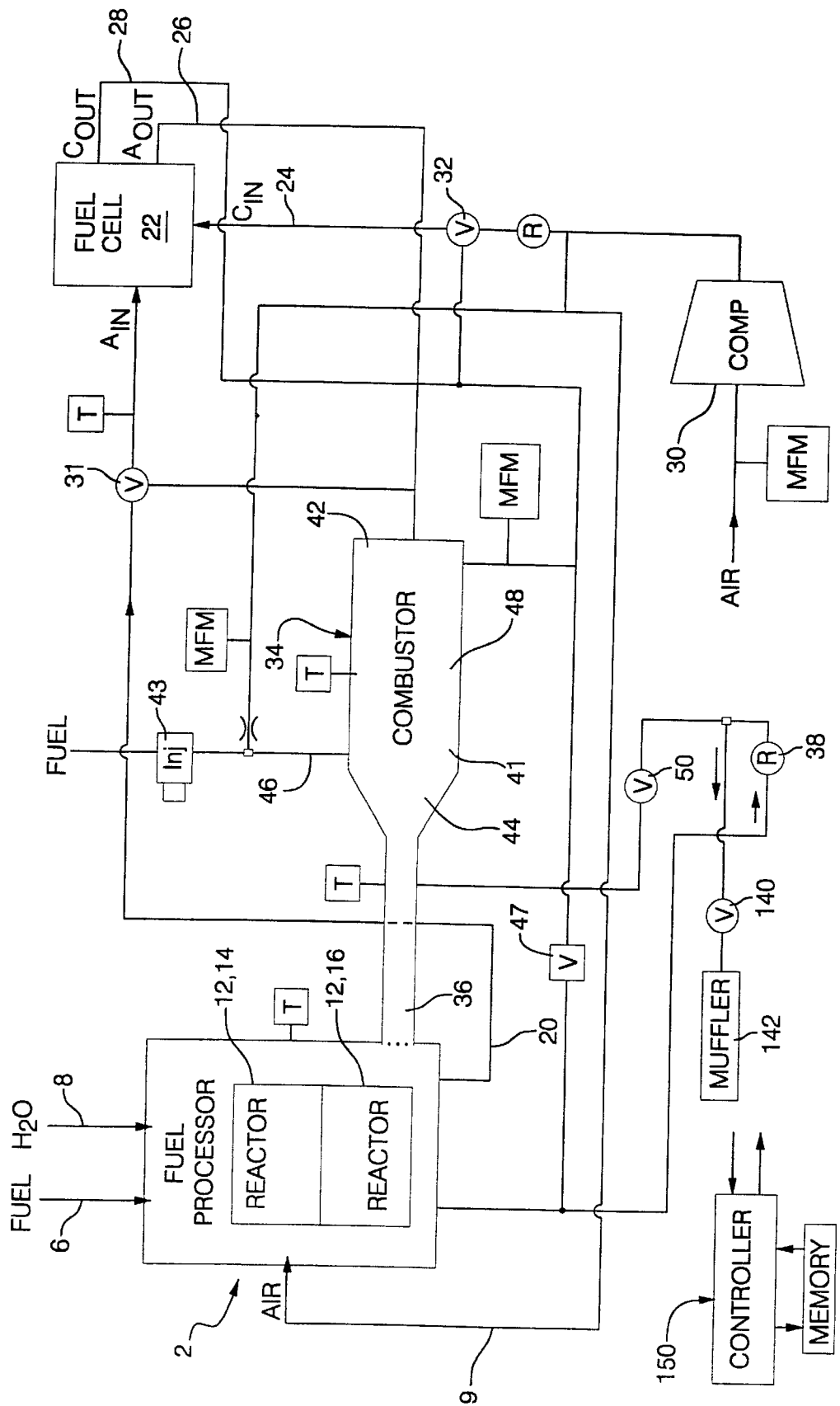
FIG. 1 is a drawing depicting a fuel cell system which can utilize the apparatus and method for efficiently heating the fuel processor according to the present invention.

The features and advantages of the present invention may be further understood with reference to the fuel cell system shown in FIG. 1 by example only. Therefore, before further describing the invention, it is useful to understand the system within which the present invention may be implemented.

FIG. 1 illustrates an example of a fuel cell system. The system may be used in a vehicle (not shown) as an energy source for vehicle propulsion. In the system, a hydrocarbon is processed in a fuel processor, for example, by reformation and preferential oxidation processes, to produce a reformate gas which has a relatively high hydrogen content on a volume or molar basis. Therefore, reference is made to hydrogen-rich or relatively high hydrogen content.

The invention is hereafter described in the context of a fuel cell fueled by an $H_2$-rich reformate regardless of the method by which such reformate is made. It is to be understood that the principles embodied herein are applicable to fuel cells fueled by $H_2$ obtained from any source, including reformable hydrocarbon and hydrogen-containing fuels such as methanol, ethanol, gasoline, alkene, or other aliphatic or aromatic hydrocarbons.

As shown in FIG. 1, a fuel cell apparatus includes a fuel processor 2 for catalytically reacting a reformable hydrocarbon fuel stream 6, and water in the form of steam from a water stream 8. In some fuel processors, air is also used in a combination preferential oxidation/steam reforming reaction. In this case, fuel processor 2 also receives an air stream 9. The fuel processor contains one or more reactors 12 wherein the reformable hydrocarbon fuel in stream 6 undergoes dissociation in the presence of water/steam 8 and sometimes air (in stream 9) to produce the hydrogen-rich reformate. Further, each reactor 12 may comprise one or more reactor beds. Reactor 12 may have one or more sections or beds, and a variety of designs are known and usable. Therefore, the selection and arrangement of reactors 12 may vary; and exemplary fuel reformation reactor(s) 14 and downstream reactor(s) 16 are described immediately below.

By way of example, in an exemplary steam/methanol reformation process, methanol and water (as steam) are ideally reacted in a reactor 14 to generate hydrogen and carbon monoxide as described earlier in the background. In reality, carbon monoxide and water are also produced. By way of further example, in an exemplary gasoline reformation process, steam, air and gasoline are reacted in a fuel processor which comprises a reactor 14 which has two sections. One section of the reactor 14 is primarily a partial oxidation reactor (POX) and the other section of the reactor is primarily a steam reformer (SR). As in the case of methanol reformation, gasoline reformation produces the desired hydrogen but, in addition, produces carbon dioxide, water and carbon monoxide. Therefore, after each type of reformation, it is desirable to reduce the carbon monoxide content of the product stream.

Accordingly, the fuel processor typically also includes one or more downstream reactors 16, such as water/gas shift (WGS) and preferential oxidizer (PROX) reactors which are used to produced carbon dioxide from carbon monoxide, as described earlier in the background. Preferably, the initial reformate output gas stream which comprises hydrogen, carbon dioxide, carbon monoxide and water is further treated in a preferential oxidation (PROX) reactor 16 to reduce the CO-levels therein to acceptable levels, for example, below 20 ppm. The $H_2$ rich reformate 20 is then fed through valve 31 into the anode chamber of a fuel cell 22. At the same time, oxygen (e.g., air) from an oxidant stream 24 is fed into the cathode chamber of the fuel cell 22. The hydrogen from the reformate stream 20 and the oxygen from the oxidant stream 24 react in the fuel cell 22 to produce electricity.

Exhaust or effluent 26 from the anode side of the fuel cell 22 contains some unreacted hydrogen. The exhaust or effluent 28 from the cathode side of the fuel cell 22 contains some unreacted oxygen. Air for the oxidant stream 24 is provided by an air supply, preferably compressor 30. Air from the air supply (compressor 30) is directed to the fuel cell 22 by a valve 32 under normal operating conditions. During start-up, however, the valve 32 is actuated to provide air to the input of a combustor 34. The air is used in combustor 34 to react with a fuel supplied through line 46. The heat of combustion is used to heat various parts of the fuel processor 2.

It should be noted that some of the reactions which occur in fuel processor 2 are endothermic and so require heat; other reactions are exothermic and require removal of heat. Typically, the PROX reactor 16 requires removal of heat. One or more of the reformation reactions in reactor 14 are typically endothermic and require heat be added. This is typically accomplished by preheating reactants, fuel 6, steam 8, and air 9 and/or by heating selected reactors.

Heat from the combustor 34 heats selected reactors and reactor beds in the fuel processor 2 during start-up. The combustor 34 achieves heating of the selected reactors and beds in the fuel processor, as necessary, by indirect heat transfer thereto. Typically, such indirectly heated reactors comprise a reaction chamber with inlet and an outlet. Within the reaction chamber, the beds are in the form of carrier member substrates each having a first surface carrying catalytically active material for accomplishing the desired chemical reactions. A second surface opposite the first surface is for heat transfer from hot gases to the carrier member substrates. In addition, the combustor 34 is usable to preheat the fuel 6, water 8 and air 9 being supplied as reactants to the fuel processor 2.

It should be noted that the air 9 supplied to the fuel processor 2 may be used in one or more of the reactors 12. If reactor 14 is a gasoline reformation reactor, then air from line 9 is supplied to reactor 14. The PROX reactor 16 also utilizes air to oxidize CO to $CO_2$ and also receives air from air supply source (compressor 30) via line 9.

The combustor 34 defines a chamber 41 with an inlet end 42, an exhaust end 44 and a catalyst section 48 between the ends. Hydrocarbon fuel is injected into the combustor. The hydrocarbon fuel, if in liquid form, is preferably vaporized either before being injected into the combustor or in a section of the combustor to disperse the fuel for combustion. Vaporization may be done by an electric heater. Once the system is operating and the combustor has heated up, vaporization may occur by heat exchange using heat from the combustor exhaust to vaporize incoming fuel. Preferably, a fuel metering device 43 is provided to control the rate at which hydrocarbon fuel is provided to the combustor.

The hydrocarbon fuel 46 and the anode effluent 26 are reacted in the catalyst section 48 of the combustor 34, which section is between the inlet and exhaust ends 42 and 44, respectively, of the combustor 34. Oxygen is provided to the combustor 34 either from the air supply (i.e., compressor 30) via valve 32 or from a second air flow stream, such as a cathode effluent stream 28, depending on system operating conditions. A valve 50 permits dumping of the combustor exhaust 36 to atmosphere when it is not needed to heat reactors in the fuel processor 2.

As can be seen, the hydrocarbon fuel stream 46 supplements the anode effluent 26 fuel for the combustor 34, as may be needed, to meet the transient and steady state needs of the fuel cell apparatus. In some situations, exhaust gas passes through a regulator 38, a shutoff valve 140 and a muffler 142 before being released to the atmosphere. In FIG. 1, the symbols are as follows: V is a valve, MFM is a mass flow meter, T is a temperature monitor, R is a regulator, C is the cathode side of the fuel cell, A is the anode side of fuel cell, INJ is an injector, and COMP is a compressor.

The amount of heat demanded by the selected reactors with the fuel processor 2, which is to be supplied by the combustor 34, is dependent upon the amount of fuel and water input and ultimately the desired reaction temperature in the fuel processor 2. As stated earlier, sometimes air is also used in the fuel processor reactor and must also be considered along with the fuel and water input. To supply the heat demand of the fuel processor 2, the combustor 34 utilizes all anode exhaust or effluent and potentially some hydrocarbon fuel. Enthalpy equations are used to determine the amount of cathode exhaust air to be supplied to the combustor 34 to meet the desired temperature requirements of the combustor 34 and ultimately to satisfy the fuel processor 2. The oxygen or air provided to the combustor 34 includes one or both of cathode effluent exhaust 28, which is typically a percentage of the total oxygen supplied to the cathode of the fuel cell 22, and a compressor output air stream depending on whether the apparatus is operating in a start-up mode wherein the compressor air stream is exclusively employed, or in a run mode using the cathode effluent 28 and/or compressor air. In the run mode, any total air, oxygen or diluent demand required by the combustor 34, which is not met by the cathode effluent 28, is supplied by the compressor 30 in an amount to satisfy the heat and temperature demanded by the combustor 34 and the fuel processor 2. The air control is implemented via an air dilution valve 47 which preferably is a stepper motor driven valve having a variable orifice to control the amount of bleed-off of cathode exhaust 28 supplied to the combustor 34.

In this exemplary representation of a fuel cell apparatus, operation is as follows. At the beginning of operations when the fuel cell apparatus is cold and starting up: (1) the compressor 30 is driven by an electric motor energized from an external source (e.g., a battery) to provide the necessary system air; (2) air is introduced into the combustor 34; hydrocarbon fuel 46 (e.g., MeOH or gasoline) is injected into the combustor 34; (3) the air and fuel react in the combustor 34, where substantially complete combustion of the fuel is effected; and (4) the hot exhaust gases exiting the combustor 34 are conveyed to the selected reactors 12 associated with the fuel processor 2.

Once the reactors in the fuel processor 2 have attained adequate temperature, the reformation process begins and: (1) valve 32 is activated to direct air to the cathode side of the fuel cell 22; (2) fuel and water are fed to the fuel processor 2 to commence the reformation reaction; (3) reformate exiting the fuel processor 2 is fed to the anode side of the fuel cell 22; (4) anode effluent 26 from the fuel cell 22 is directed into the combustor 34; (5) cathode effluent 28 from the fuel cell 22 is directed into the combustor 34; (6) the fuel, air, cathode effluent 28 and anode effluent 26 are burned in the combustor 34.

Under certain conditions, the combustor 34 could operate solely on the anode and cathode effluents, without the need for additional hydrocarbon fuel 46. Under such conditions, fuel injection to the combustor 34 is discontinued. Under other conditions, e.g., increasing power demands, supplemental fuel 46 is provided to the combustor 34. It can be seen that the combustor 34 receives multiple fuels, such as a hydrocarbon fuel as well as anode effluent 26 from the anode of the fuel cell 22. Oxygen depleted exhaust air 28 from the cathode of the fuel cell 22 and air from the compressor 30 are also supplied to the combustor 34.

According to the present fuel cell system example, a controller 150 shown in FIG. 1 controls various aspects of the operation of the system shown in FIG. 1. The controller 150 may comprise any suitable microprocessor, microcontroller, personal computer, etc., which has central processing unit capable of executing a control program and data stored in a memory. The controller 150 may be a dedicated controller specific to any of the components in FIG. 1, or implemented in software stored in the main vehicle electronic control module. Further, although software based control programs are usable for controlling system components in various modes of operation as described above, it will also be understood that the control can also be implemented in part or whole by dedicated electronic circuitry.

Figure 2:
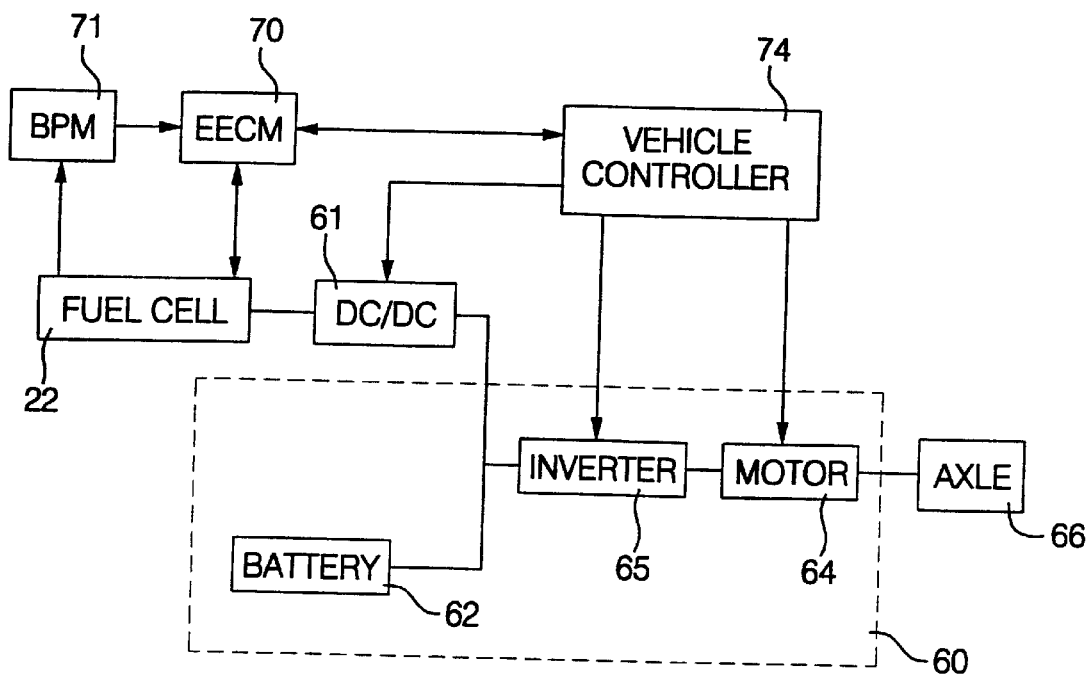
FIG. 2 is a drawing of the fuel cell apparatus shown in FIG. 1 connected in a pictorial representation of a use application.

In a preferred embodiment, the fuel cell system comprises the fuel cell 22 as part of a vehicle propulsion system 60 (see FIG. 2). Here, a portion of the circuit 60 external to the fuel cell system, comprises a battery 62, an electric motor 64, and associated drive electronics including inverter 65 constructed and arranged to accept electric energy from a DC/DC converter 61 associated with the fuel cell system, and particularly fuel cell 22, and to convert it to mechanical energy produced by motor 64. The battery 62 is constructed and arranged to accept and store electrical energy supplied by fuel cell 22 and to accept and store electrical energy supplied by motor 64 during regenerative breaking, and to provide electric energy to motor 64. The motor 64 is coupled to driving axle 66 to rotate wheels of a vehicle (not shown). An electrochemical engine control module (EECM) 70 and a battery pack module (BPM) 71 monitor various operating parameters, including, but not limited to, the voltage and current of the stack. For example, this is done by the battery pack module (BPM) 71, or by the BPM 71 and the EECM 70 together, to send an output signal (message) to the vehicle controller 74 based on conditions monitored by the BPM 71. The vehicle controller 74 controls the electric motor 64, the drive electronics including inverter 65, the DC/DC converter 61, and requests a power level from the EECM 70.

As described above, the fuel cell apparatus has an efficient hardware arrangement in which the three major components of the fuel cell system, namely, the combustor 34, the fuel cell stack 22, and the fuel processor 2 are interconnected. The combustor 34 receives fuel from the stack 22, the stack 22 receives fuel from the fuel processor 2, and the fuel processor receives heat from the combustor 34.

In the fuel cell apparatus shown by example in FIG. 1, the fuel cell stack 22 requires a specific amount of reformate or fuel from the fuel processor 2. The amount of reformate required depends on the vehicle load and its operating anode lambda which is about 1.2, for example, meaning that the fuel cell stack 22 receives 1.2 times the hydrogen needed for the amperage requested by the vehicle load. Supplying more or less than the required amount of reformate from the fuel processor 2 hurts efficiency or does not meet the load needs of the vehicle. Further, the combustor 34 must consume all of the excess hydrogen exiting the fuel cell 22 which is not consumed by the fuel cell 22. This is necessary in order to prevent the escape of flammable hydrogen from the fuel cell system.

Since it is difficult to maintain the operating conditions of the fuel processor 2, the fuel cell stack 22 and the combustor 34 in a perfect balance, adjustments must be made to at least one of the fuel cell components. The combustor 34 happens to be the best component for any needed adjustment or balancing.

If the balancing requires dumping energy, dumping heat from the combustor 34 is the safest way to lose energy as dumping excess reformate or hydrogen is dangerous. Alternately, if the balancing requires added energy, again, the combustor 34 is the best element for generating extra heat since generating extra hydrogen as a way to increase heat is an involved process.

In normal operation, if the combustor 34 sends too much heat to the fuel processor 2, a proportional heat dump valve 50 opens a predetermined amount to divert heat away from the heat exchanger of the fuel processor 2. Alternately, if the combustor 34 is sending too little heat to the fuel processor 2, the fuel injector 43 to the combustor 34 turns on to supplement the hydrogen received from the anode of the fuel cell stack 22. The fuel injector 43 is an existing element in the fuel cell system since the fuel cell start-up procedure requires a liquid fuel injector.

Figure 3:
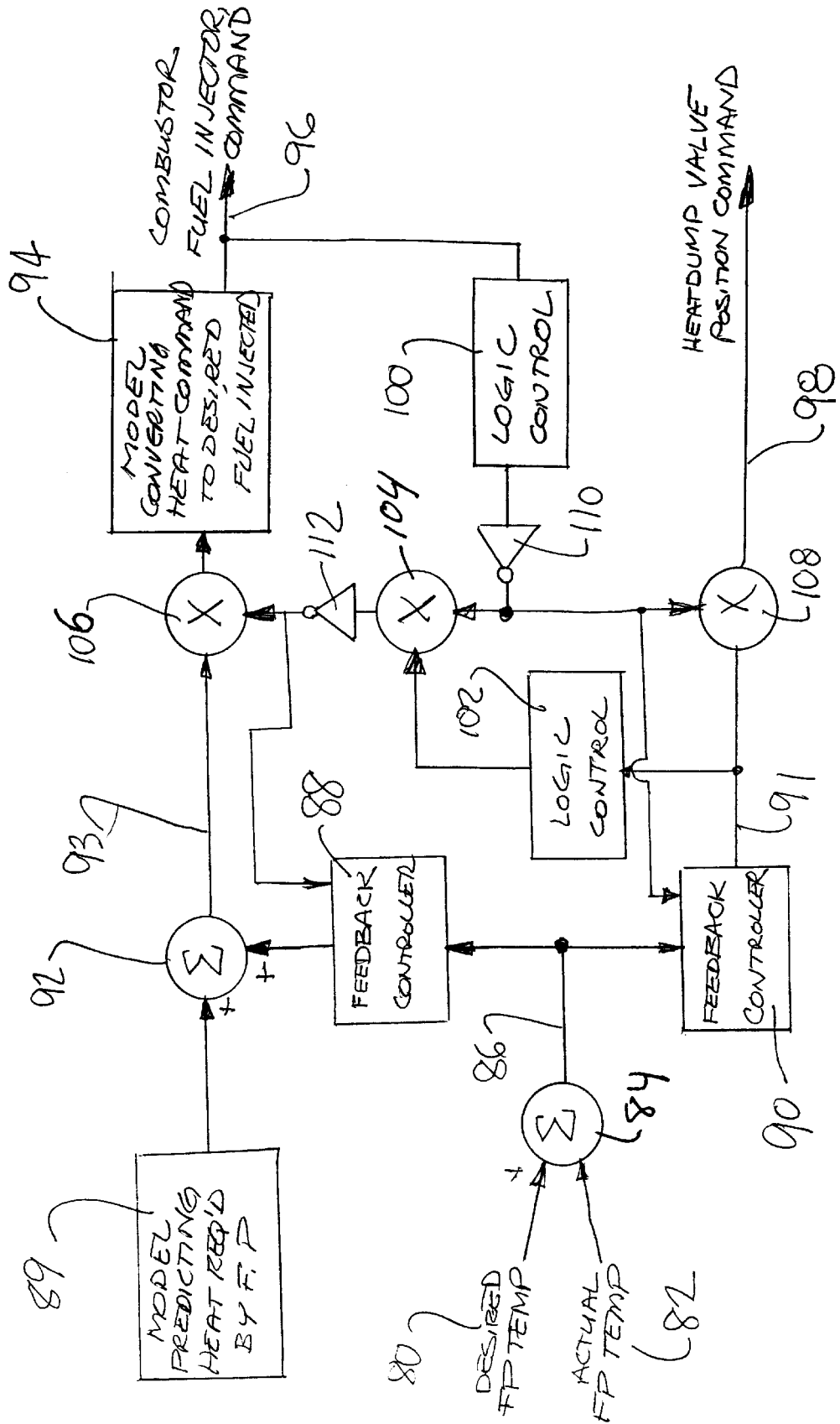
FIG. 3 is a flow/control diagram of the method and apparatus of the present invention.

However, it is important that a control apparatus and method be implemented to prevent simultaneous activation of the heat dump valve 50 and the fuel injector 43. FIG. 3 depicts a flow process implementing the control apparatus and method of the present invention. It will be understood that the following description of the inventive apparatus and method is preferably implemented in a software control program executed by the controller 150 or the EECM 70. Alternately, some or all of the functions of the inventive control apparatus and method may be implemented in hardware components in a solid state electronic circuit.

Further, the following description of the inventive control apparatus and method will be described under a given load applied to the fuel cell 22 to produce a required amount of electrical energy for the specified use application, such as propelling a vehicle. The controller 150 controls the fuel cell system by determining the load demands on the fuel cell 22 and then activates the combustor 34 to supply a given amount of heat to the fuel processor 2 to maintain the temperature of the fuel processor 2 at the specified level in order to generate the quantity of hydrogen necessary to operate the fuel cell 22 at the required amperage demanded by the load. Thus, the controller 150 checks the desired temperature of the fuel processor 2 in step 80 and compares the desired temperature with the actual temperature of the fuel processor 2 as determined in step 82 in a summing function 84. A temperature error signal 86 is provided by the output of the summing function 84.

The temperature error signal 86 is supplied to feedback elements 88 and 90. Preferably, the feedback elements 88 and 90 are closed loop feedback controllers. Although any control feedback may be employed which uses an error signal to adjust a variably settable element, such as valve or fuel injector, a PID controller is preferably employed for the controllers 88 and 90 shown in FIG. 3.

The PID controllers 88 and 90 include proportional, integral and derivative terms which are added to or subtracted from the error signal to develop the desired output control signal. Conventional PID control loops may be implemented in either hardware or software. For example, in a conventional hardware implementation, the PID terms may be provided by separate amplifier, integrator and differentiator circuits. Alternately, and preferred in the present invention, the PID terms are provided in a software implementation by the controller 150 or the EECM 70 which executes a conventional control algorithm to generate values for the control signal in response to applied error values for measurement and set point inputs to determine the magnitude of the output control signal.

As shown in FIG. 3, the feedback controller 88 supplies a control signal to a combustor fuel injector 43 command control; while the feedback controller 90 provides a control signal to a heat dump valve 50 position command control.

The proportional term in each PID controller 88 and 90 represents a linear gain factor related to the magnitude of the error signal and the magnitude of the control signal is necessary to achieve the desired orifice cross-sectional area. The integral term is a longtime constant linear gain term related to the integral of the error signal and used to reduce the residual error that would otherwise occur in a proportional only control loop between the set point and measured values. The derivative term is the derivative of the error signal and enhances system response to short-term transients without reducing the long-term accuracy benefits of the integral term.

As is conventional in PID control loops, calibrations or gains are supplied to each term to trim the operation of the PID loop. These gains are supplied to a multiplier as is conventional.

Looking first at the combustor fuel injector command control, the output of the feedback controller 88, which represents a heat trim signal, is supplied as an input to a summer 92 along with a predicted heat input from a math model 89 stored in the controller 150 or EECM 70 which predicts the amount of heat required by the fuel processor 2 to meet a particular energy load requirement placed on the fuel cell 22. A description and operation of the model 89 which predicts the amount of heat required by the fuel processor 2 is described in co-pending U.S. patent application Ser. No. 09/358,080, filed Jul. 21, 1999, entitled "Methanol Tail Gas Combustor Control Method" and assigned to the assignee of the present invention. The contents of this co-pending application are incorporated herein in their entireity. The output of the summer 92 is a signal 93 indicating the magnitude of the desired heat. This signal is multiplied with a heat trim enable signal as described hereafter and input to another model 94 stored in the controller 150 or EECM 70 which converts the heat trim or command value to a specified orifice cross-sectional area of the fuel injector 43. A description and operation of a model 94 suitable for use in the present invention may be had by referring to the above-mentioned co-pending application Ser. No. 09/358,080, already incorporated herein by reference. Alternately, the heat command may be converted to a variably selectable "on" time period for a fixed orifice fuel injector 43. This process generates a combustor fuel injector command signal 96 which is supplied to the fuel injector 43 to supply the desired amount of excess fuel to the combustor 34 to raise the temperature of the fuel processor 2 to the desired temperature specified in step 80.

It should be noted that the heat trim enable or heat desired signal alters the heat request into the combustor model instead of directly commanding a quantity of fuel flow. As the combustor model matches air flow to the fuel flow, it must know the exact fuel command for effective operation of the combustor 34.

The feedback controller 90 generates a heat dump valve desired position signal 91 which specifies the desired position of the heat dump valve 50 in terms of a desired orifice diameter of the heat dump valve 50. This signal 91 is multiplied with a heat dump valve enable signal, as described hereafter, to supply a heat dump valve position command signal 98 to the valve 50 for setting the variable orifice of the valve 50 to thereby dump a predetermined amount of excess heat from the fuel processor 2 to atmosphere to lower the temperature of the fuel processor 2 to the desired temperature in step 80 consistent with the load placed on the fuel cell 22.

It is important that the combustor fuel injector 43 and the heat dump valve 50 be prevented from operating simultaneously. Generally, if the heat dump valve 50 is open allowing excess heat to flow to atmosphere, the heat dump valve 50 will only shut or close when the fuel processor 2 cools down to a predetermined temperature. Once the heat dump valve 50 is closed, the combustor fuel injector 43 is enabled in case the fuel processor 2 gets too cool. Enabling of the fuel injector 43 locks out the heat dump valve 50 until the fuel processor 2 temperature again gets too high.

This lockout process which prevents simultaneous operation of the combustor fuel injector 43 and the heat dump valve 50 is implemented by means of logic controls 100 and 102 and multipliers 104, 106, and 108 as shown in FIG. 3. The logic controls 100 and 102 may be implemented in hardware elements or, preferably, in a software control routine wherein the output of each logic control 100 and 102 is zero if the input is zero; otherwise, the output is one whenever the input is not zero. The input to the logic control 100 is the combustor fuel injector command signal 96. The input to the logic control 102 is the heat dump valve desired position signal 91.

An example of the operation of the method and apparatus shown in FIG. 3 will now be described in conjunction with two examples. In a first example, it is assumed that the desired temperature of the fuel processor 2 in step 80 is higher than the actual temperature of the fuel processor 2 as determined in step 82. The temperature error signal 86 from the summer 84 generates a positive signal to the feedback controller 88 which outputs a heat trim adjustment to the summer 92. This adjustment varies the predicted heat required by the fuel processor 2 under the then current load demand on the fuel cell 22. The output of the summer 92 is a heat desired signal 93 which is input to the multiplier 106. Assuming that the other input of the multiplier 106 is a logic "one" level signal, the desired heat will be converted in step 94 to the desired amount of injected fuel to generate the combustor fuel injector command signal 96. Since the signal 96 is greater than zero, the control logic 100 outputs a one logic signal to inverter 110. The output of the inverter 110 is then a logic zero. The output of the inverter 110 is supplied as an input to the multipliers 104 and 108, and, when at a zero logic level, causes the output of the multipliers 104 and 108 to also be zero. In the case of multiplier 108, a zero output causes the heat dump valve position command signal 98 to be zero thereby ensuring that the heat dump valve 50 remains closed. The zero output of the inverter 110 causes the output of the multiplier 104 to also be zero. The output of the multiplier 104 is converted by inverter 112 to a logic one signal which is supplied to the multiplier 100 as described above.

In a second example, the actual temperature of the fuel processor 2 is assumed to be greater than the desired temperature of the fuel processor 2. The comparator 84 will output a temperature error signal 86 indicating a desired heat decrease. The signal will be input to the feedback controller 90 which will output the heat dump valve desired position signal 91. The position signal 91 is then input to the logic control 102. Since the input of the logic control 102 is greater than zero, the logic control 102 supplies a one logic level signal to the multiplier 104. The output of the multiplier 104 supplies a logic one to the inverter 112 which outputs a zero logic signal to the multiplier 106 thereby preventing any conversion of a heat desired signal 93 to a heat command in step 94.

In this manner, the combustor fuel injector 43 and the heat dump valve 50 are prevented from operating simultaneously. This is ensured by the use of the logic controls 100 and 102. Any non-zero output specifying a heat dump valve position command 50 or a combustor fuel injector command signal 96, whichever occurs first, will immediately, through the inverters 112 and 110, respectively, cause the multipliers 106 and 108 associated with the opposed heat trim enable or heat dump valve enable controls to be held at zero thereby preventing any activation of the opposite element, such as the combustor fuel injector 43 or the heat dump valve 50 when the other of the heat dump valve 50 or the combustor fuel injector 43 is open. This ensures that the two feedback controllers 88 and 90 do not fight each other during operation.

It should also be noted that an output signal from the inverters 110 and 112 is connected to the feedback controller 90 and 88, respectively, to stall the integrator employed in the PID loop in each feedback controller 90 and 88. The integrator is stalled and prevented from counting upon receiving a zero logic signal from the respective inverter 112 and 110. The feedback controllers 88 and 90 reset on a one logic signal from the respective inverters 112 and 110.

In summary, there has been disclosed a unique control method and apparatus which provides efficient fuel processor operation by preventing the combustor fuel injector and the heat dump valve from operating at the same time. This enables the combustor to maintain the temperature of the fuel processor at the required temperature in an efficient and accurate manner.

What is claimed:

1. In a fuel cell system having a fuel processor generating reformate to a fuel cell stack, a combustor generating heat for the fuel processor upon combusting a fuel from one of a variable fuel injector and excess fuel from the fuel cell stack, and a heat dump valve coupled to the combustor for diverting excess heat from the combustor, the method comprising the steps of:

determining a temperature difference between the actual operating temperature of the fuel processor and the desired operating temperature of the fuel processor at a given fuel cell stack load;

if the actual temperature of the fuel processor is less than the desired temperature of the fuel processor, predicting the amount of heat required by the fuel processor based on the determined temperature difference;

generating a command to the fuel injector to supply fuel to the combustor to generate the required amount of heat only if the heat dump valve is closed;

if the actual temperature of the fuel processor is greater than the desired temperature of the fuel processor, determining the amount of heat that must be diverted from the combustor prior to input to the fuel processor to lower the actual temperature of the fuel processor to the desired temperature;

determining the position of the heat dump valve orifice to divert the determined amount of heat; and generating a command to the heat dump valve orifice to divert the desired amount of heat only if the fuel injector is closed.

2. The method of claim 1 further comprising the steps of:

determining if the fuel injector orifice is opened and generating a signal; and determining if the heat dump valve is opened and generating a signal.

3. The method of claim 1 further comprising the step of:

providing the heat dump valve as a linear actuator with a variable diameter outlet.

4. The method of claim 1 further comprising the step of:
maintaining the heat dump valve open until the actual temperature of the fuel processor equals or is less than the desired operating temperature of the fuel processor.

5. The method of claim 1 further comprising the step of:
maintaining the fuel injector on until the actual temperature of the fuel processor is greater than or equal to the desired operating temperature of the fuel processor.

6. The method of claim 1 wherein the step of generating the required amount of heat comprises the step of:
generating a required heat command; and
converting the required heat command to the amount of fuel injected through the fuel injector based on air flow to the combustor.

7. An apparatus for controlling the heat supplied to a fuel processor in a fuel cell system including a fuel processor, a fuel cell stack and a combustor, a heat dump valve coupled to the combustor for diverting heat supplied by the combustor to the fuel processor, and a fuel injector for supplying fuel to the combustor, the apparatus comprising:
means for predicting the heat required by the fuel processor for a given load on the fuel cell stack;
means for determining a temperature difference between the actual operating temperature of the fuel processor and the desired operating temperature of the fuel processor at a given load;
means for obtaining a desired heat value from the predicted heat required and the temperature difference;
means for converting the desired heat value to a desired fuel injector flow signal;
means for determining a heat dump valve flow position for a desired amount of heat diversion; and
means, responsive to the state of the heat dump valve and the fuel injector, for preventing the heat dump valve from opening if the fuel injector is opened and for preventing the fuel injector from opening if the heat dump valve is opened.

8. The apparatus of claim 7 wherein the heat dump valve comprises a linear actuator having a variable diameter flow outlet.

9. The apparatus of claim 7 further comprising:
means, responsive to the position of the fuel injector flow outlet, for generating a signal if the fuel injector outlet is open; and
means, responsive to the position of the heat dump valve flow outlet, for generating a signal if the heat dump valve flow outlet is open.

10. The apparatus of claim 7 wherein the means for obtaining the desired heat value comprises:
means for generating a required heat command; and
means for converting the required heat command to an amount of fuel injected through the fuel injector based on air flow to the combustor.

11. The apparatus of claim 10 wherein the means for generating a required heat command comprises:
a feedback control responsive to the means for determining a temperature difference.

12. The apparatus of claim 11 wherein the feedback control is a PID control.

13. The apparatus of claim 7 wherein the means for determining a heat dump valve flow position comprises:
a feedback control responsive to the means for determining a temperature difference.

14. The apparatus of claim 13 wherein the feedback control is a PID control.

15. In a fuel cell system having a fuel processor generating reformate to a fuel cell stack, a combustor generating heat for the fuel processor upon combusting a fuel from one of a variable fuel supply source and excess fuel from the fuel cell stack, and a heat dump valve coupled to the combustor for diverting excess heat from the combustor, the method comprising the steps of:
determining an actual operating temperature of the fuel processor and a desired operating temperature of the fuel processor at a given fuel cell stack load;
if the actual temperature of the fuel processor is less than the desired temperature of the fuel processor, predicting the amount of heat required by the fuel processor based on comparing the actual and desired temperatures;
generating a command to the fuel supply source to supply fuel to the combustor to generate the required amount of heat only if the heat dump valve is closed;
if the actual temperature of the fuel processor is greater than the desired temperature of the fuel processor, determining the amount of heat that must be diverted from the combustor prior to input to the fuel processor to lower the actual temperature of the fuel processor to the desired temperature;
determining the position of the heat dump valve orifice to divert the determined amount of heat; and
generating a command to the heat dump valve orifice to divert the desired amount of heat only if the fuel supply source is not supplying fuel.

16. An apparatus for controlling the heat supplied to a fuel processor in a fuel cell system including a fuel processor, a fuel cell stack and a combustor, a heat dump valve coupled to the combustor for diverting heat supplied by the combustor to the fuel processor, and a fuel injector for supplying fuel to the combustor, the apparatus comprising:
means for predicting the heat required by the fuel processor for a given load on the fuel cell stack;
means for determining an actual operating temperature of the fuel processor and a desired operating temperature of the fuel processor at a given load;
means for obtaining a desired heat value based on the predicted heat required and a comparison of the actual and desired temperatures;
means for converting the desired heat value to a desired fuel injector flow signal;
means for determining a heat dump valve flow position for a desired amount of heat diversion; and
means, responsive to the state of the heat dump valve and the fuel injector, for preventing the heat dump valve from opening if the fuel injector is opened and for preventing the fuel injector from opening if the heat dump valve is opened.

* * * * *